July 2, 1940.  W. H. GILLE  2,206,182
AUTOMOTIVE BRAKE CONSTRUCTION
Filed Oct. 2, 1937   3 Sheets-Sheet 1
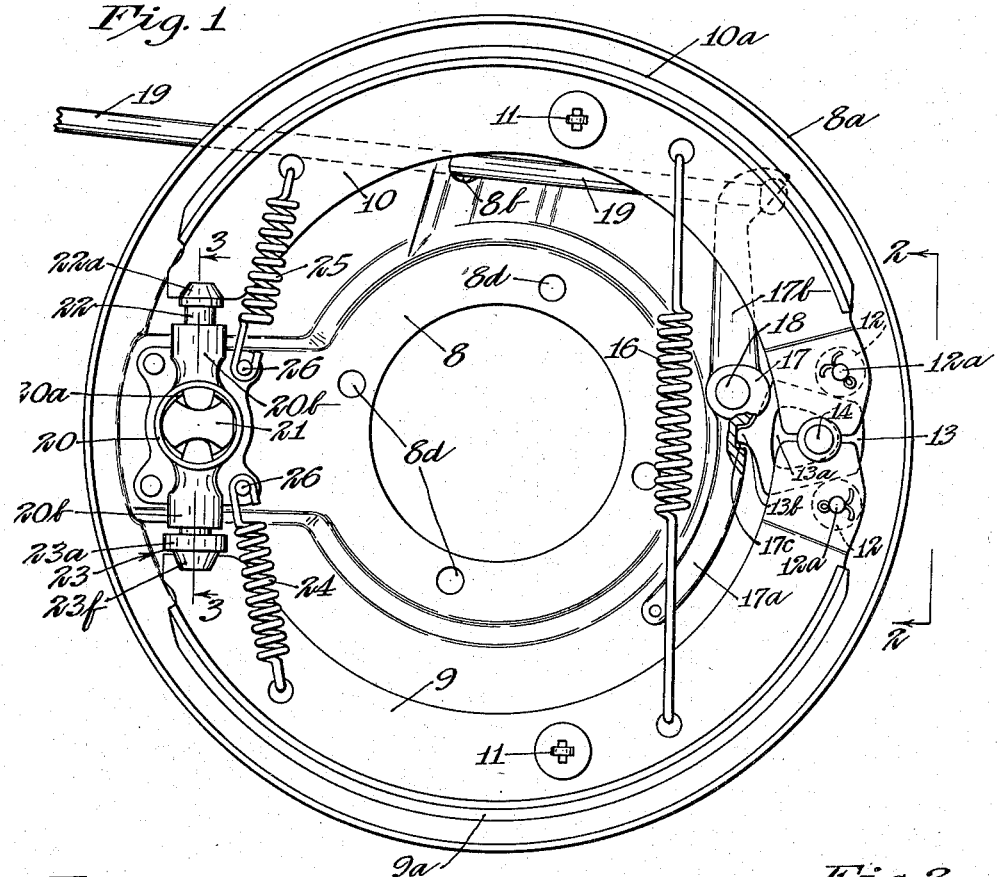
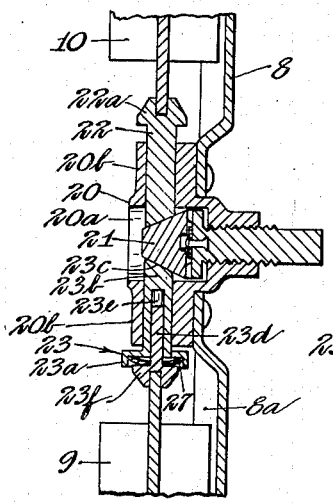
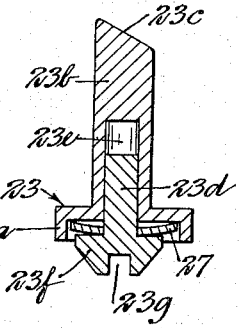
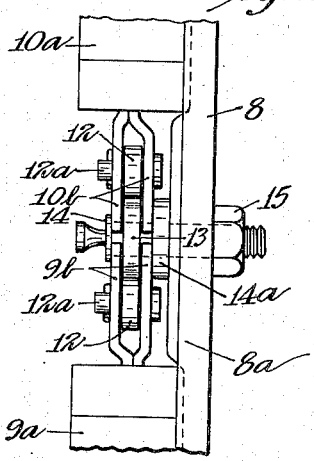
Inventor
Willis H. Gille
By Williamson & Williamson
Attorneys July 2, 1940.  W. H. GILLE  2,206,182
AUTOMOTIVE BRAKE CONSTRUCTION
Filed Oct. 2, 1937  3 Sheets-Sheet 2
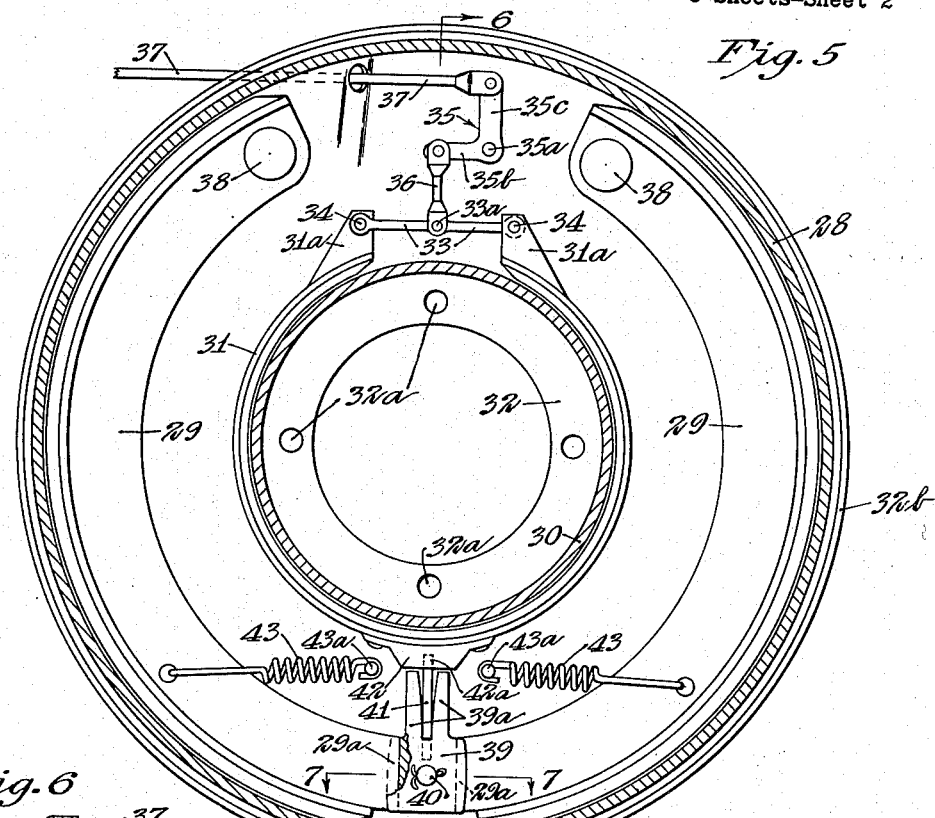
Inventor
Willis H. Gille
By Williamson & Williamson
Attorneys July 2, 1940.                  W. H. GILLE                    2,206,182
                       AUTOMOTIVE BRAKE CONSTRUCTION
                       Filed Oct. 2, 1937        3 Sheets-Sheet 3
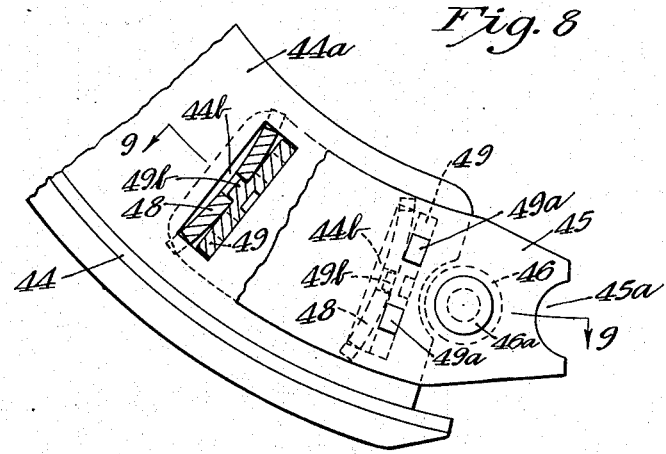
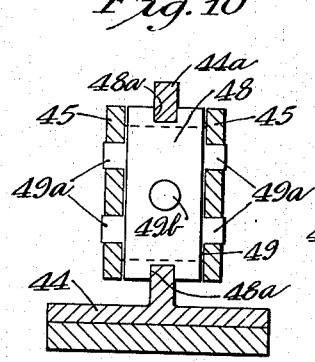
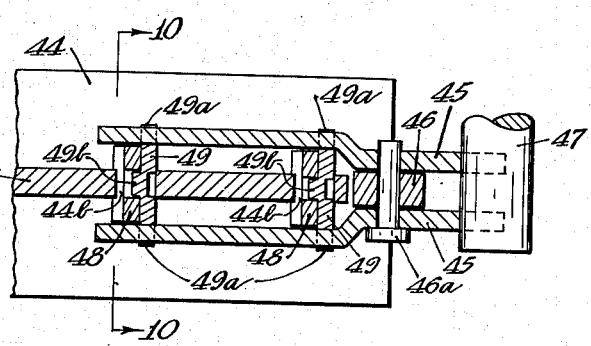
Inventor
Willis H. Gille
By Williamson & Williamson
Attorneys Patented July 2, 1940

2,206,182

UNITED STATES PATENT OFFICE 2,206,182

AUTOMOTIVE BRAKE CONSTRUCTION

Willis H. Gille, St. Paul, Minn.

Application October 2, 1937, Serial No. 166,969

8 Claims. (Cl. 188—78)

My invention relates to brake structures and particularly to automotive brake structures of the self-energizing type.

With both mechanically operated brakes and hydraulically operated brakes of the conventional self-energizing type difficulty is often experienced, particularly in damp weather, in that the brakes tend to abruptly lock the wheels of the vehicle. Such difficulty is due to the small range of travel of the brake pedal within which the complete range of minimum to maximum braking effect is obtained and is greatly aggravated by the increased coefficient of friction of the brake linings in damp weather. The range of travel of the brake pedal for the complete range of braking effect is so slight in damp weather that it is practically impossible for an operator to depress the pedal through a sufficiently accurate distance to obtain an intermediate degree of braking effect and avoid locking of the wheels of the vehicle. The tendency of the brakes to lock the wheel is not only annoying and tiring for the operator of a vehicle but may bring about skidding of the vehicle with the incidental possibility of an accident or wreck causing injury to occupants of the vehicle and damage to the vehicle.

The undesirable brake characteristic described above has been a matter of considerable concern to those engaged in manufacture and servicing of automobiles and apparently little has been heretofore accomplished toward solution of the problem presented in obtaining a remedy.

A general object of my invention is to provide a self-energizing automotive brake structure so constructed as to enable improved control of braking action both when the coefficient of friction of the brake linings is above normal and under normal conditions.

A more specific object is to provide such a brake structure enabling a relatively long range of brake pedal movement in transversing the complete range between minimum and maximum braking action whereby the pedal may be easily operated to obtain any intermediate degree of braking action regardless of variation of the coefficient of friction of the brake linings.

A still more specific object is to provide such a brake structure wherein thrust is imparted from the primary brake shoe to the secondary brake shoe through a longitudinally compressible element.

A further object is to provide such a brake structure having a longitudinally compressible element of light, compact, simple, reliable, and inexpensive construction and of such nature as to be readily applicable to conventional types of self-energizing brake structures without the necessity for extensive modification thereof.

These and other objects and advantages of the invention will more fully appear from the following description made in connection with the accompanying drawings, wherein like reference characters refer to the same or similar parts throughout the several views, and, in which:

Fig. 1 is a side view of an automotive brake structure having an embodiment of my invention incorporated therein;

Fig. 2 is a view taken along the line 2—2 of Fig. 1 as indicated by the arrows;

Fig. 3 is a sectional view taken on the line 3—3 of Fig. 1 as indicated by the arrows;

Fig. 4 is a sectional detail view;

Fig. 5 is a vertical sectional view of a modified form of automotive brake structure having incorporated therein an embodiment of my invention;

Fig. 6 is a sectional view taken along the line 6—6 of Fig. 5, as indicated by the arrows;

Fig. 7 is a sectional view taken along the line 7—7 of Fig. 5, as indicated by the arrows;

Fig. 8 is a partial view of still another form of my brake structure;

Fig. 9 is a sectional view taken along the line 9—9 of Fig. 8 as indicated by the arrows, and Fig. 10 is a sectional view taken along the line 10—10 of Fig. 9 as indicated by the arrows.

Referring to the drawings, one embodiment of my invention is shown in combination with a conventional brake structure of the partially self-energizing type in Figs. 1 to 4 inclusive. The brake structure includes a circular back plate 8 having an outwardly turned flange 8a at its peripheral edge. A pair of brake shoes 9 and 10 having brake linings 9a and 10a thereon are disposed conventionally relative to the back plate 8 and are attached thereto by means of elements 11 which connect at the medial portions of the brake shoes to the backing plate in such manner as to permit movement of the brake shoes 9 and 10 both circumferentially and radially of the backing plate 8 within limits.

At the right hand (as seen in Fig. 1) end of the pair of brake shoes 9 and 10 the shoes are respectively provided with pairs of parallel tongues 9b and 10b respectively. The tongues 9b and 10b are apertured and each pair of tongues has a roller 12 therebetween mounted on a pivot pin 12a. For spreading the ends of the brake shoes 9 and 10 apart, a wedge 13 is provided, positioned so that its inclined opposite faces engage the rollers 12 and are so arranged that radially outward movement of the wedge 13 will act upon the rollers 12 to force the brake shoes 9 and 10 apart at the right hand ends thereof. The central portion of the wedge 13 is cut away to leave an opening 13a through which a pin 14 mounted on the back plate 8 projects. The pin 14 has a flanged portion 14a bearing against the outer side of the back plate 8 and has a nut 15 mounted thereon and bearing against the inner side of the back plate 8. The pin 14 serves as a stop which is engageable by the free ends of the tongues 9b and 10b of the brake shoes 9 and 10 so as to limit movement of the brake shoes 9 and 10 toward each other. The outer ends of the tongues 9b and 10b are suitably notched to fit the pin 14 when engaged therewith. A helical tension spring 16 is connected at its respective ends to the respective brake shoes 9 and 10 so as to normally maintain the tongues 9b and 10b in engagement with the pin 14. Means is provided for operating the wedge 13, such means comprising a double ended lever 17 mounted on a pivot pin 18 which is, in turn, secured to the back plate 8. A recess 17c in the inner portion of one arm 17a of the lever 17 receives and centers a projection 13b formed on the wedge 13 as shown. The other arm 17b of the lever 17 is connected through a suitable elongated element 19 to any desired form of brake actuating control member. The elongated element 19 passes inwardly through the back plate 8 through a suitable apertured portion 8b thereof.

Connecting means is provided between the left hand (as viewed in Fig. 1) ends of the brake shoes 9 and 10 to transmit thrust from one to the other of the shoes. A casing 20 is secured to the back plate 8 between the left hand ends of the respective brake shoes 9 and 10. A cylindrical space 20a within the casing 20 contains an element 21 which is shiftable in the space 20a in a direction corresponding to a line between the left hand ends of the brake shoes 9 and 10. The casing 20 includes a pair of oppositely projecting longitudinally apertured portions 20b having a common axis extending in the direction of a line between the left hand ends of the brake shoes 9 and 10. The upper one of the elements 20b contains a plunger 22 engaged at its respective ends with the left hand end of the brake shoe 10 and a side of the shiftable element 21 within the casing 20. The lower one of the elements 20 contains a plunger 23 engaged at its respective ends with the left hand end of the brake shoe 9. Near the left hand ends thereof the brake shoes 9 and 10 are respectively provided with helical tension springs 24 and 25 connecting the respective shoes to pins 26, also serving to anchor the casing 20 to the back plate 8, as shown. The springs 24 and 25 function to yieldingly pull the brake shoes 9 and 10 inwardly.

The above described brake structure is of conventional construction with the exception of the plunger 23 which in a conventional brake structure will be a simple plunger similar to the plunger 22. The above described brake structure is mounted on the outer end of a rear axle housing in a conventional manner by suitable fastening means extending through apertures 8d in the back plate 8. A brake drum carried by a wheel associated with the portion of the rear axle housing upon which the back plate 8 is mounted may be of conventional form and the braking flange thereof would be disposed in the space lying between the flange 8a of the backing plate 8 and the brake linings 9a and 10a. Such construction, of course, is of the general type known as internal expanding brake construction.

The plunger 23 which is shown in detail in Figs. 3 and 4 is constructed in accordance with the principle of my invention. This plunger includes a cup element 23a carried on one end of a section 23b of the plunger. The other end of this section 23b being inclined as at 23c in the same manner as the inner end of the conventional plunger 22 so as to be engageable with the shiftable or floating element 21 contained within the casing 20. The section 23b of the plunger 23, is of course slidably carried in the lower one of the longitudinally apertured portions 20b of the casing 20. Within the cup 23a is seated a centrally apertured spring 27 formed of resilient metal and having a concave-convex shape. The diameter of the spring 27 is such that the peripheral edge of the spring 27 will have clearance from the interior periphery of the cup 23a. A second section 23d of the plunger 23 is telescopically contained in a suitable cylindrical recess 23e in the first described section 23b of the plunger 23. The second section 23d of the plunger 23 extends through the central aperture of the spring 27, and at the outer side of the spring 27 has a head 23f formed thereon and arranged to abut the outer side of the spring 27. The head 23f may be of a shape similar to that of the head 22a of the conventional plunger 22 and in the same manner is provided with a notch 23g wherein the left hand end of the brake shoe 9 is received. The spring 27 is of the type sometimes referred to as a Belville spring disc and may be designed to have characteristics suited to use in the particular brake structure with which it is associated. As an example, the ratio between the applied pressure on the spring 27 and the distance of deflection thereof may be in the general neighborhood of 10,000 pounds per inch and the spring may be designed to permit a total deflection of from .020 inch to .030 inch.

The above described conventional brake structure with which an embodiment of my invention has been combined as described, is of the type usually referred to as the self-energizing type wherein a primary brake shoe, applied to the brake drum in response to pressure on the brake pedal of the vehicle with which the brake is associated, moves a short distance with the brake drum and such motion is utilized for applying the secondary brake shoe to the brake drum. It is to be noted that in the structure of Fig. 1, the plunger 22, floating element 21 and plunger 23 comprise a connecting means for transmitting thrust from one brake shoe to the other and that the spring 27 converts this connecting means from an unyielding means to a longitudinally yieldable means.

In operation of the described brake structure, pressure on the brake pedal of a vehicle with which it is used places tension on the elongated element 19 so as to swing the lever 17b and force the wedge 13 between the rollers 12a, so as to spread apart the right hand ends of the brake shoes 9 and 10. For purposes of operation, it is hereinafter assumed that the direction of rotation of a brake drum associated with the described structure is clockwise and that the brake shoes 9 and 10 respectively constitute primary and secondary shoes. Since the direction of rotation is clockwise the brake drum will maintain the secondary brake shoe 10 in engagement with the stop pin 14, and the primary brake shoe 9 will be moved into engagement with the brake drum. During the first part of the movement of the wedge 13 the primary shoe 9 is shifted both circumferentially in a clockwise direction and also outwardly for frictional engagement with the brake drum. Thereupon, the primary shoe will be carried in a clockwise direction by the brake drum as the wedge 13 is advanced but such movement will be only to a point where the primary shoe has a tendency to leave contact with the wedge 13. Thus the degree of clockwise circumferential displacement of the primary shoe 9 is determined by the position of the wedge 13, and as the wedge 13 is advanced the primary shoe 9 will be advanced in proportion. This action is substantially independent of the coefficient of friction of the primary shoe lining 9a.

As the primary shoe 9 is advanced responsive to the movement of the wedge 13, the movement of the primary shoe is transmitted through the plunger 23, the floating element 21, and the plunger 22 to the secondary shoe 10 to press the secondary shoe toward the brake drum. Obviously the secondary shoe 10 is prevented from circumferential movement by the stop pin 14 and, therefore, can be moved only outwardly toward the brake drum.

After the secondary shoe 10 reaches engagement with the drum, a base of resistance is produced whereby a very slight further advance of the primary shoe 9 will place a very heavy pressure on the secondary shoe 10 in the case where a conventional plunger, such as the plunger 22 is used, in place of my improved plunger 23. Accordingly, the range from minimum to maximum braking effect of the secondary shoe will be obtained within a very small distance of the movement of the wedge 13 and, hence, of the brake pedal. When the coefficient of friction of the lining 10a on the secondary shoe 10 is above normal, as will occur due to dampness, the distance of movement of the pedal for the range between minimum braking action and braking action sufficient to lock the vehicle wheel is so slight that it is practically impossible for an operator to so operate the brakes as to obtain intermediate degrees of braking effect and avoid the occurrence of undesired locking of the vehicle wheel.

With a plunger 23 constructed in accordance with my invention, used in the brake structure to provide a yieldable connecting means between the left hand ends of the brake shoes 9 and 10, an entirely different operating characteristic is provided in the entire brake structure. When the engagement of the secondary shoe 10 with the brake drum provides a base of resistance, further advance of the primary shoe will be accompanied by gradual compression of the spring 27 and the pressure applied to the secondary shoe 10 will be that pressure to which the spring 27 has been compressed. Since the primary shoe must be moved through a substantial distance to compress the spring 27 from its uncompressed condition to a degree of compression which will cause sufficient pressure on the secondary shoe to bring about locking of the vehicle wheels, it follows that the range from minimum to maximum braking effect of the secondary shoe will be spread over a considerable distance of travel of the wedge 13 and, accordingly, of the brake pedal of the vehicle. It also follows that the brake pedal may be readily operated to obtain any desired intermediate degree of braking effect and to avoid undesired locking of the wheels regardless of the usual variations in the coefficient of friction of the lining 10a of the secondary shoe 10.

It should be apparent that incorporating my longitudinally yieldable plunger 23 in a conventional brake structure requires extremely little modification of the conventional brake structure but at the same time produces a far reaching effect on the characteristics of the entire brake system of a vehicle. It is to be noted that, when extreme braking action is desired, the spring 27 may be compressed to such a point that the inner concave side thereof will abut the bottom of the cup 23a whereupon the connecting means for transmitting thrust from the brake shoe 9 to the brake shoe 10 will become incompressible and force will then be unyieldingly transmitted from the primary shoe 9 to the secondary shoe 10. An embodiment of my invention as above described has been incorporated in the brake system of an automobile wherein the brake action had been of a very unsatisfactory nature, and it is found that incorporation of the embodiment of my invention greatly improved the operating characteristics of the brakes and rendered the brakes capable of very easy and accurate control of the degree of braking effort afforded.

In Figs. 5, 6 and 7 a modified form of my improved brake structure is shown. In this form the brake drum unit includes an outer or main brake drum 28 having a pair of brake shoes 29 arranged for braking engagement therewith and an inner or pilot brake drum 30 having a brake band 31 encircling the same for braking engagement therewith. The two brake drums 28 and 29 are, of course, both mounted on a wheel (not shown) of a vehicle so as to rotate therewith. A backing plate 32 is provided adapted to be mounted on the outer end of a rear axle housing by a suitable means extending through apertures 32a in the backing plate 32. The backing plate 32 may be provided with a flange 32b at its periphery to overlie the outer brake drum 28. The brake band 31 working on the pilot drum 30 functions in the manner of the primary shoe in the conventional form of brake structure, and the brake shoes 29 function in the manner of the secondary shoe of the conventional brake and have the advantage of being adapted to engage almost the entire inner peripheral area of the outer brake drum 28.

Operating means is provided for contracting the brake band 31 about the pilot drum 30 so as to frictionally engage the same. The brake band 31 is provided at the ends thereof with lugs or ears 31a, which are connected together by means of a toggle 33 pivotally connected to the respective lugs 31a by means of pivot pins 34 and having a toggle joint at the center thereof pivotally connected by means of a pivot pin 33a. Above the toggle 33 is a bell crank 35 pivotally mounted on a pin 35a supported by the back plate 32. The bell crank 35 is so disposed normally that one arm 35b thereof is extended in a direction substantially parallel to the length of the toggle 33. The free end of the arm 35b is pivotally connected to a link 36 which at its remaining end is pivotally mounted on the pivot pin 33a of the toggle 33. The upper arm 35c of the bell crank 35 may be connected to an elongated element 37 which may extend to suitable brake operating means such as the conventional brake pedal commonly found in an automobile.

It will be seen that tension on the elongated element 37 will swing the bell crank 35 in a counter-clockwise direction and the bell crank 35 will thrust the link 36 downwardly to deflect the toggle 33 downwardly so that the toggle 33 will be shortened to pull the lugs 31a toward each other and, hence, contract brake band 31 about the pilot drum 30. The brake band 31 is free for movement circumferentially of the pilot drum 30 within limits, and accordingly when the brake band 31 is frictionally engaged with the drum 30, it will tend to move in the direction of rotation of the drum 30. When this movement has proceeded through a sufficient distance, the link 36 will become disposed at an angle and will deflect the toggle 33 upwardly toward its normal undeflected position. Such movement of the toggle 33 will increase the distance between the lugs 31a and hence release the grip of brake band 31 on the primary drum 30. It should be apparent that the distance to which the brake band 31 will be shifted due to frictional engagement with the pilot drum 30, will be determined by the position of the bell crank 35. That is, the further the bell crank 35 is swung counter-clockwise, the greater will be the distance to which the brake band 31 will be displaced circumferentially of the pilot drum 30.

The secondary or main brake shoes 29 are provided with operating means for shifting the same into engagement with the main drum 28 responsive to circumferentially shifting of the brake band 31. The brake shoes 29 are pivotally mounted at their upper ends on pivot pins 38 carried by the backing plate 32 and the lower ends of the brake shoes 29 are somewhat spaced apart. A cam 39 of a substantially rectangular peripheral shape is pivotally mounted on a pivot pin 40 carried by the back plate 32. The lower ends of the brake shoes 29 are in engagement with the cam 39 so that rotation of the cam 39 through a slight angle will spread apart the brake shoes 29 and cause the same to frictionally engage the main drum 28. The lower ends of the brake shoes 29 are provided with tongues 29a received in a suitable annular groove in the periphery of the cam 39. The cam 39 is provided with an upwardly projecting slightly resilient element 41 which is received at its upper end in a notch 42a formed in a block 42 secured to the lower portion of the brake band 31. It will be seen that movement of the brake band 31 as described above will swing the resilient element 41 whereby the cam 39 will be rotated to apply the brake shoes 29 to the main brake drum 28. The resiliency of the element 41 will, of course, provide the same advantages as were obtained in the brake structure of Figs. 1 to 4 by means of the spring 27. In order to limit the degree to which the resilient element 41 will be deflected relative to cam 39, a pair of somewhat tapered fingers 39a are mounted on the cam 39 in upwardly projecting relation thereto and at respective opposite sides of the resilient element 41 as shown. In cases where extreme braking action is desired, the resilient element will be brought into abutment with one of the fingers 39a and the movement of the band 31 will be non-yieldingly applied for rotating the brake shoe operating cam 39.

For returning the brake shoes 29 to normal position, helical tension springs 43 are suitably connected between the brake shoes 29 and pins 43a carried by the back plate 32.

Figs. 8 to 10 inclusive illustrate still another form of my improved brake structure generally similar to the structure of Figs. 1 to 3 inclusive and differing therefrom as will be described.

The longitudinally compressible plunger 23 used in the structure of Figs. 1 to 3 is preferably replaced in the structure of Figs. 8 to 10 with a non-compressible plunger such as the plunger 22 of Figs. 1 and 3 so that the respective brake shoes of the form illustrated in Figs. 8 to 10 are connected at their tips through longitudinally non-compressible means. A brake shoe 44 shown in Figs. 8 to 10 corresponds to the brake shoe 9 of Fig. 1.

In the structure of Figs. 8 to 10 the principle of my invention is carried out by inserting compressible means between the brake shoe 44 and the roller-carrying, stop-engaging elements 45 thereof.

The pair of stop-engaging elements 45 are disposed at opposite sides of the end portion of the web 44a of the brake shoe 44 in parallel, spaced relation thereto and project beyond the end thereof. A roller 46, to be engaged by a brake operating wedge such as the wedge 13 of Figs. 1 and 2, is disposed between the respective elements 45 and is rotatably mounted on the medial portion of an axle pin 46a carried in suitable aligned apertures provided in the respective elements 45. The free ends of the elements 45 are provided with substantially semi-circular notches 45a adapting the elements 45 with a stop pin 47 generally similar to the stop pin 14 of Figs. 1 and 2. The elements 45 are bent, as shown, so that their respective projecting portions are disposed closely adjacent opposite sides of the roller 46 and constitute a guide for a brake operating wedge such as the wedge 13 of Figs. 1 and 2.

The portions of the elements 45 associated with the web 44a of the brake shoe are connected to the web 44a through yieldable means whereby the combination of the elements 45 and the brake shoe 44 will be longitudinally compressible. Apertures 44b, preferably rectangular in shape, are provided in the portion of the web 44a associated with the elements 45 and are spaced apart longitudinally of the web 44a with the longer dimension of each aperture 44b extending radially of a circle of which the brake shoe 44 follows an arc. An arched flat spring 48 is placed in each of the apertures 44b with the end portions of the spring 48 engaging a portion of the web 44a defining the side of the aperture 44b farthest from the roller 46 and with the convex side of the spring 48 facing toward the roller 46. Each spring 48 is somewhat longer than the aperture 44b and is notched at its respective ends as at 48a to receive portions of the web 44a defining the ends of the aperture 44b so as to be retained in the aperture 44b by portions of the spring 48 defining the notches 48a.

Means is provided for connecting the medial portions of the springs 48 to the elements 45. For this purpose a rectangular rigid plate 49 is placed in each of the apertures 44b generally parallel to the coresponding spring 48 and disposed at the side thereof toward the roller 46. Each plate 49 has ears 49a secured in apertures provided in the elements 45. The center portion of each plate 49 is provided with a small boss 49b thereon received in an aperture formed in the center of the corresponding spring 48 for maintaining the plates 49 in properly aligned relation with the springs 48. Duplication of the springs 48 and plates 49 acts, of course, to maintain the elements 45 in proper alignment with the web 44a.

From the above it should be apparent that the brake shoe 44 and the elements 45 are connected through resilient means so that the combination thereof is longitudinally compressible.

When the elements 45 are engaged with the stop pin 47 and pressure is applied by suitable means to the end of the brake shoe 44 opposite the end carrying the elements 45, the brake shoe 44 will shift outwardly into engagement with a brake drum associated therewith to frictionally engage therewith. In such case the stop pin 47 will act as a base of resistance and the brake drum will tend to carry the shoe 44 theretoward. Movement of the shoe 44 toward the stop pin 47 will be resistingly permitted by the springs 48 with an accompanying building up of pressure in the springs 48. Such movement will cease when the brake shoe tends to leave contact with the brake shoe operator and hence the pressure produced in the springs 48 will be dependent upon and vary with the position of the brake shoe operator and accordingly the position of the brake pedal. The pressure with which the brake shoe 44 is applied to a brake drum associated therewith is proportional to the pressure built up in the springs 48 and is hence dependent upon the position of the brake pedal. Since an appreciable distance of travel of the brake shoe 44 toward the stop pin 47 is required in building up pressure in the springs 48 to a magnitude affording maximum braking effect, it follows that the range between minimum and maximum braking effect will be obtained in a relatively long distance of pedal travel and that a user will be enabled to very easily operate the brake pedal to obtain any desired degree of braking effect. The above described action will take place when pressure originating in a brake pedal is applied to the end of the brake shoe opposite the elements 45. Also, when said opposite end of the shoe 44 is in communication with a base of resistance and pressure is applied, by means of a suitable brake shoe operator, to the roller 46, an advantageous action takes place.

When the brake shoe 44 is engaged with a brake drum, pressure applied to the roller 46 by a brake operating wedge will tend to flex the spring 48 and the pressure of the spring 48 corresponding to the degree of flexure thereof will constitute the pressure applied to the brake shoe 44 longitudinally thereof. Obviously the range from minimum to maximum braking effect will be obtained through a much wider range of brake pedal movement than in the case where the elements 45 are rigidly secured to the web 44a.

Where the above described construction is applied to one end of a single brake shoe it is obvious that the remaining end of the brake shoe may be associated with a second brake shoe or with stop or anchoring means in accordance with conventional practice. Where two brake shoes are used in symmetrical relation to each other in conjunction with a common brake drum, the mutually adjoining ends of the respective shoes may each be constructed in accordance with the arrangement illustrated in Figs. 8, 9 and 10 and may both be associated with a common brake shoe operating element.

It is to be noted that, in each of the embodiments of my invention described above, the improved operation attained therewith will be afforded when the brakes are applied during either forward or reverse rotation of the brake drums associated therewith.

It will be apparent that I have invented novel, compact, effective, simple and inexpensive means for greatly improving the action and control of automotive brakes of the so-called self-energizing type. Obviously the principle I have disclosed is readily adaptable for use with numerous kinds of brakes other than those applied to automobiles.

It will, of course, be understood that various changes may be made in the form, details, arrangement and proportions of the various parts without departing from the scope of my invention.

What is claimed is:

1. In an automotive brake structure of the partially self-energizing type, a brake drum having the usual cylindrical inner periphery, a pair of oppositely disposed curved brake shoes mounted for work against respective portions of the inner peripheral area of said brake drum, said shoes being mounted for limited shifting movement circumferentially of said drum and also for outward shifting movement against said inner periphery, operating means for spreading two of the corresponding ends of said shoes apart to move the braking surface of at least one of said shoes against such periphery whereby the rotation of said drum will move said shoe circumferentially and means connecting the other corresponding ends of said shoes to impart circumferentially directed thrust from said drum-energized shoe to said second shoe to press the same against said inner periphery, said connecting means having interposed therein a unit compressible longitudinally thereof comprising, a cup element disposed co-axially with said connecting means and mounted on one section thereof and a somewhat dished resilient disc seated in said cup with its convex side facing outwardly, the remaining section of said connecting means being connected, at the end thereof toward said first section, with the central portion of said disc.

2. The structure defined in claim 1 and means for maintaining the respective sections of said connecting means in axial alignment with each other.

3. In an automotive brake structure of the partially self-energizing type, a brake drum having the usual cylindrical inner periphery, a pair of oppositely disposed curved brake shoes mounted for work against respective portions of the inner peripheral area of said brake drum, said shoes being mounted for limited shifting movement circumferentially of said drum and also for outward shifting movement against said inner periphery, operating means for spreading two of the corresponding ends of said shoes apart to move the braking surface of at least one of said shoes against such periphery whereby the rotation of said drum will move said shoe circumferentially and means connecting the other corresponding ends of said shoes to impart circumferentially directed thrust from said drum-energized shoe to said second shoe to press the same against said inner periphery, said connecting means being medially severed to form two sections thereof, a cup element mounted on the severed end of one of said sections in co-axial relation thereto, a centrally apertured resilient concavo-convex element seated in said cup with its concave side innermost, the severed end of the second of said sections being in abutment with the center of the convex side of said resilient element, and a centering and guide element projecting co-axially outwardly of the severed end of said second section through the aperture of said resilient element, said cup element having a recess therein disposed co-axially thereof and slidingly receiving said guide element to and maintain said respective sections in axial alignment with each other.

4. In an automotive brake structure of the partially self-energizing type, a brake drum having the usual cylindrical inner periphery, a pair of oppositely disposed curved brake shoes mounted for work against respective portions of the inner peripheral area of said brake drum, said shoes being mounted for limited shifting movement circumferentially of said drum and also for outward shifting movement against said inner periphery, operating means for spreading two of the corresponding ends of said shoes apart to move the braking surface of at least one of said shoes against such periphery whereby the rotation of said drum will move said shoe circumferentially and means connecting the other corresponding ends of said shoes to impart circumferentially directed thrust from said drum-energized shoe to said second shoe to press the same against said inner periphery, said connecting means having interposed therein a unit compressible longitudinally thereof comprising, a somewhat dished resilient disc disposed co-axially of said connecting means, the central portion of the convex side and the marginal portion of the concave side of said disc being in engagement with portions of said connecting means at respective corresponding sides of said disc.

5. In an automotive brake structure of the partially self-energizing type, a brake drum having the usual cylindrical inner periphery, a series of elements disposed inwardly of said periphery in circumferentially extending relation therewith and including, a pair of arcuate brake shoes mounted for limited shifting movement circumferentially of said drum and outwardly into frictional engagement therewith, means between mutually facing ends of said respective shoes for spreading said ends apart, means interconnecting the remaining ends of said shoes for transmitting circumferential thrust therebetween, and stop means for limiting circumferential movement of said shoes, means compressible circumferentially of said series interposed between two of the elements of said series and comprising an arched resilient element having respective concave and convex sides facing respective elements of said series between which said resilient element is interposed, outer portions and the central portion of said resilient element being connected to respective ones of said two elements toward which the respective concave and convex sides of said resilient element respectively, face, and means for limiting flattening of said resilient element under pressure.

6. In an automotive brake structure of the partially self-energizing type, a brake drum having the usual cylindrical inner periphery, a series of elements disposed inwardly of said periphery in circumferentially extending relation therewith and including, a pair of arcuate brake shoes mounted for limited shifting movement circumferentially of said drum and outwardly into frictional engagement therewith, means between mutually facing ends of said respective shoes for spreading said ends apart, means interconnecting the remaining ends of said shoes for transmitting circumferential thrust therebetween, and stop means for limiting circumferential movement of said shoes, means compressible circumferentially of said series interposed between two of the elements of said series and comprising a somewhat dished resilient disc disposed co-axially of a line extending circumferentially of said series, the marginal and central portions of said disc being connected to the respective ones of said two elements toward which the concave and convex sides of said disc respectively face, and means for limiting flattening of said disc under pressure.

7. In an automotive brake structure of the partially self-energizing type, a brake drum having the usual cylindrical inner periphery, a series of elements situated within and extending circumferentially of said drum and including, a pair of oppositely disposed curved brake shoes mounted for work against respective portions of the inner peripheral area of said brake drum, said shoes being mounted for limited shifting movement circumferentially of said drum and also for outward shifting movement against said inner periphery, operating means for spreading apart mutually facing ends of said respective shoes to engage at least one of said shoes with said inner periphery whereby the rotation of said drum will move said shoe circumferentially, means connecting the remaining ends of said shoes to impart circumferentially directed thrust from said drum-energized shoe to said second shoe to press the same against said inner periphery, and stop means for limiting circumferential movement of said pair of shoes, and a unit compressible circumferentially of said series interposed in said series and comprising, a cup element disposed co-axially of a line extending circumferentially of said series and connected to one element of said series, and a somewhat dished resilient disc seated in said cup with its convex side facing outwardly, the central portion of said disc being connected to a second element of said series whereby thrust circumferentially of said series will be transmitted from said one element to said second element through said disc.

8. In an automotive brake structure of the partially self-energizing type, a brake drum having the usual cylindrical inner periphery, a series of elements disposed inwardly of said periphery in circumferentially extending relation therewith and including, a pair of arcuate brake shoes mounted for limited shifting movement circumferentially of said drum and outwardly into frictional engagement therewith, means between mutually facing ends of said respective shoes for spreading said ends apart, means interconnecting the remaining ends of said shoes for transmitting circumferential thrust therebetween, and stop means for limiting circumferential movement of said shoes, means compressible circumferentially of said series interposed between two of the elements of said series and comprising a resilient element having respective sides facing respective elements of said series between which said resilient element is interposed, outer portions and the central portion of said resilient element being connected to respective ones of said two elements, and means for limiting deflection of said resilient element under pressure.

WILLIS H. GILLE.